United States Patent
Post, Jr.

(10) Patent No.: US 12,477,294 B2
(45) Date of Patent: Nov. 18, 2025

(54) DASHBOARDS FOR P2P MESH NETWORKS TO FACILITATE DEVICE MANAGEMENT

(71) Applicant: DittoLive Incorporated, San Francisco, CA (US)

(72) Inventor: William Charles Post, Jr., Apex, NC (US)

(73) Assignee: DittoLive Incorporated, San Francisco, CA (US)

( * ) Notice: Subject to any disclaimer, the term of this patent is extended or adjusted under 35 U.S.C. 154(b) by 0 days.

(21) Appl. No.: 18/139,116

(22) Filed: Apr. 25, 2023

(65) Prior Publication Data

US 2024/0364599 A1 Oct. 31, 2024

(51) Int. Cl.
| | |
|---|---|
| H04S 7/00 | (2006.01) |
| G01S 3/02 | (2006.01) |
| G01S 3/80 | (2006.01) |
| G06F 3/16 | (2006.01) |
| H04L 41/22 | (2022.01) |
| H04L 67/1042 | (2022.01) |
| H04R 3/04 | (2006.01) |

(Continued)

(52) U.S. Cl.
CPC ............ *H04S 7/303* (2013.01); *G01S 3/023* (2013.01); *G01S 3/80* (2013.01); *G06F 3/165* (2013.01); *H04L 41/22* (2013.01); *H04L 67/1042* (2013.01); *H04R 3/04* (2013.01); *H04R 27/00* (2013.01); *H04R 29/001* (2013.01); *H04R 29/008* (2013.01); *H04S 7/302* (2013.01); *H04R 2227/005* (2013.01); *H04R 2430/01* (2013.01); *H04S 7/301* (2013.01)

(58) Field of Classification Search
None
See application file for complete search history.

(56) References Cited

U.S. PATENT DOCUMENTS 7,987,233 B1 * 7/2011 Osborne ............. H04L 65/1043
709/206
9,497,136 B1 * 11/2016 Ramarao ............... G06F 9/5072
(Continued)

FOREIGN PATENT DOCUMENTS

WO WO-2011127189 A2 * 10/2011 ....... H04L 29/12952

OTHER PUBLICATIONS

International Search Report and Written Opinion received for PCT Patent Application No. PCT/US24/25246, mailed on Aug. 19, 2024, 15 pages.

*Primary Examiner* — Uyen T Le
(74) *Attorney, Agent, or Firm* — Workman Nydegger

(57) ABSTRACT

Techniques for implementing an MDM platform with a P2P mesh network are disclosed. This MDM platform uses a dashboard to facilitate the control of the devices/peers in the P2P mesh network. This network includes: (i) a service, (ii) a first device, and (iii) a second device. The first device is connected to the service by way of a first P2P mesh network connection between the first device and the service. The second device is connected to the service by way of (i) a second P2P mesh network connection between the second device and the first device and (ii) the first P2P mesh network connection between the first device and the service. Data is transmitted using those connections. A dashboard displays the data. The dashboard can also be used to trigger MDM commands to any device in the P2P mesh network, including those that are not connected to the Internet.

21 Claims, 14 Drawing Sheets

(51) Int. Cl.
*H04R 27/00* (2006.01)
*H04R 29/00* (2006.01)

(56) References Cited

U.S. PATENT DOCUMENTS

| | | |
|---|---|---|
| 9,590,876 B2 * | 3/2017 | Purusothaman ........ H04L 41/22 |
| 10,547,521 B1 * | 1/2020 | Roy ........................ H04L 43/06 |
| 11,108,862 B2 | 8/2021 | Kistner |
| 11,593,098 B2 | 2/2023 | Vincent et al. |
| 11,922,074 B1 * | 3/2024 | Thomason ............. G06F 3/0604 |
| 2002/0093527 A1 * | 7/2002 | Sherlock ............. H04L 63/1433 715/736 |
| 2009/0063187 A1 * | 3/2009 | Johnson .................. H04L 67/52 705/2 |
| 2009/0063193 A1 * | 3/2009 | Barton .................... G08B 21/02 340/539.11 |
| 2010/0008255 A1 * | 1/2010 | Khosravy ............. H04W 4/021 370/254 |
| 2010/0124196 A1 * | 5/2010 | Bonar .................. H04B 7/0689 455/445 |
| 2011/0116416 A1 * | 5/2011 | Dobson ................ H04W 40/20 370/255 |
| 2022/0163959 A1 * | 5/2022 | Cella .................. G06V 10/7715 |

* cited by examiner

DASHBOARDS FOR P2P MESH NETWORKS TO FACILITATE DEVICE MANAGEMENT

BACKGROUND

A peer-to-peer (P2P) network is a type of distributed, decentralized computing architecture that includes multiple peers. A peer is one of the computing nodes in the network. A workload can be partitioned and delivered to various peers to facilitate parallel processing of that workload. To do so, each peer can provide various portions of its computing resources to the P2P network to allow the peers in the P2P network to collectively accomplish various workload tasks. As a result, each peer in the P2P network can be a supplier of a computing resource and a consumer of a computing resource. Mobile device management (MDM) refers to a technique for managing mobile devices, which can operate as peers, to protect an organization's data or other assets. The MDM architecture implements various policies on the devices, which can be employee-owned devices or enterprise-owned devices, to protect data on those devices as well as to perform other operations. Generally, the MDM architecture includes a centralized service that pushes policy and other information out to devices that are directly connected to the Internet. If one of the peers/devices is not connected to the Internet, then that device is unable to receive the policy that is sent by the centralized service. The result is that the device might then operate in a rogue manner, might not be adequately protected, or might expose data that should not be exposed.

P2P networks have many advantages over traditional centralized networks. For instance, a P2P network can optionally avoid governance from a centralized authority. P2P networks are also highly scalable, thereby providing increased resilience and durability for the network as a whole. Although P2P networks have many benefits, managing the peers in the P2P network has been a challenge. What is needed, therefore, is an improved methodology for managing the peers in a P2P network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for implementing a MDM platform for use in a P2P mesh network, or simply a "P2P network."

Some embodiments implement a dashboard that displays information describing devices included in the P2P mesh network. This dashboard can be implemented by a service. The embodiments access the P2P mesh network, which comprises: (i) the service, (ii) a first device, and (iii) a second device. The first device is connected to the service by way of a first P2P mesh network connection between the first device and the service. The second device is connected to the service by way of (i) a second P2P mesh network connection between the second device and the first device and (ii) the first P2P mesh network connection between the first device and the service. In these embodiments, the service receives, from the first device, first data that originated at the first device. The first data is received or transmitted via the first P2P mesh network connection. In these embodiments, the service also receives, from the first device, second data that originated at the second device. The second data is received or transmitted by way of the first P2P mesh network connection and the second P2P mesh network connection. These embodiments provide access to a dashboard, which is configured to display the first data and the second data.

Some embodiments access the P2P mesh network, which comprises: (i) the service, which is either operating on an on-premise computer system or in a cloud environment, (ii) a first device, and (iii) a second device. The first device is connected to the service by way of a first P2P mesh network connection between the first device and the service. The second device is connected to the service by way of (i) a second P2P mesh network connection between the second device and the first device and (ii) the first P2P mesh network connection between the first device and the service. The embodiments identify, from within a dashboard that lists devices included in the P2P mesh network, the second device. The embodiments trigger, from the dashboard, transmission of an MDM command to the second device. The MDM command is sent to the second device over the P2P mesh network by way of the first P2P mesh network connection and by way of the second P2P mesh network connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
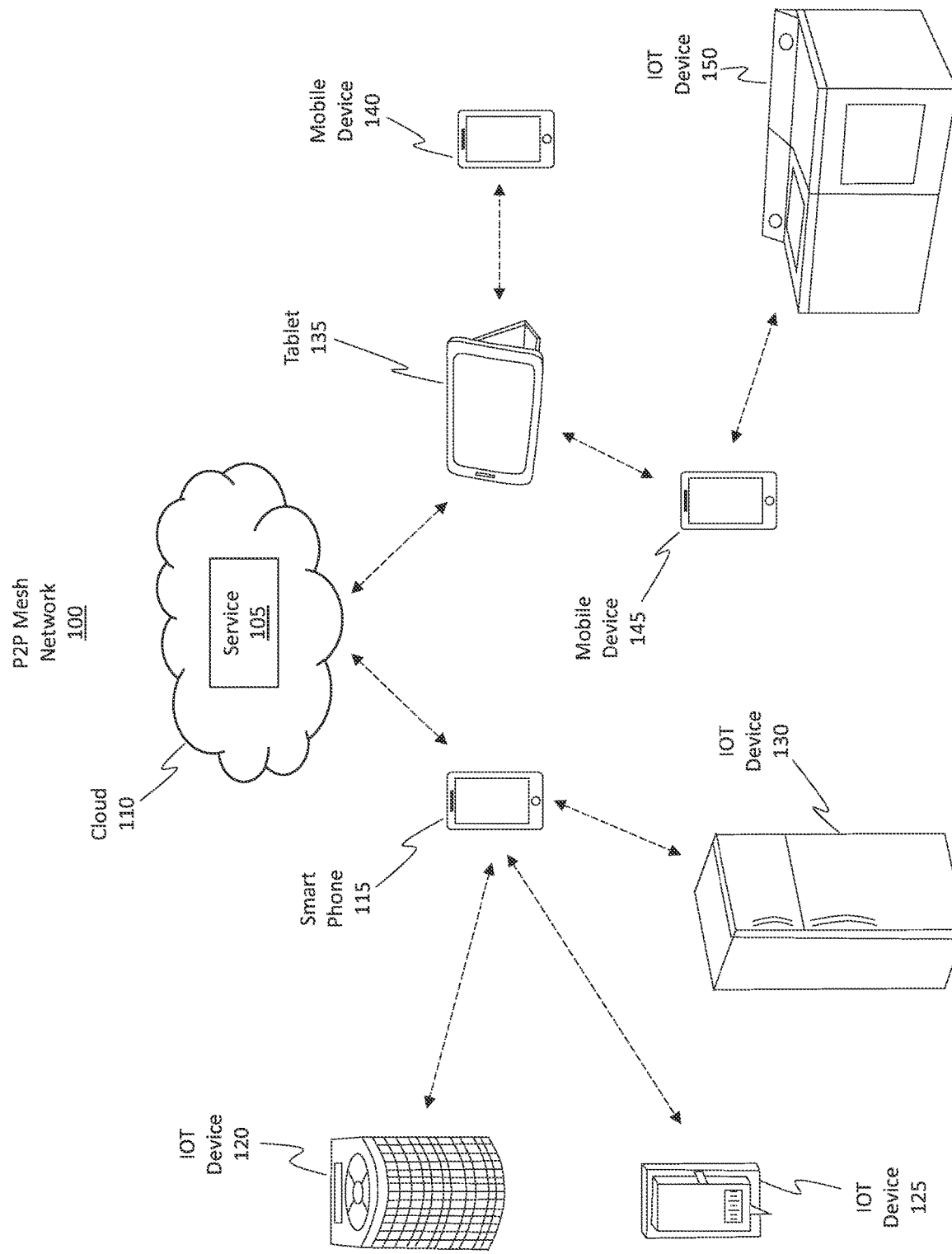
FIG. 1 illustrates an example of a so-called "big peer" (i.e. the service, as it operates in the cloud) operating in a peer-to-peer (P2P) mesh network.

Embodiments disclosed herein relate to systems, devices, and methods for implementing a MDM platform for use in a P2P mesh network. This MDM platform uses a dashboard to facilitate the control of the various devices in the P2P mesh network. Commands can be sent to the devices from the dashboard, and responses to those commands can be displayed in the dashboard. The dashboard also includes functionality for generating the commands.

Some embodiments access the P2P mesh network, which comprises: (i) a service, (ii) a first device, and (iii) a second device. The first device is connected to the service by way of a first P2P mesh network connection. The second device is connected to the service by way of (i) a second P2P mesh network connection between the second device and the first device and (ii) the first P2P mesh network connection. The embodiments receive first data that originated at the first device. The embodiments also receive second data that originated at the second device. The embodiments provide access to a dashboard, which is configured to display the first and second data.

Some embodiments access the P2P mesh network. The embodiments identify, from within a dashboard that lists devices included in the P2P mesh network, the second device. The embodiments trigger, from the dashboard, transmission of an MDM command to the second device. The MDM command is sent to the second device over the P2P mesh network.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits to the technical field of mobile device management, in part by combining aspects of P2P mesh networks with dashboards that enable device management for mobile devices even when those devices are not connected to an MDM service. In particular, this disclosure describes how to implement a dashboard that enables MDM in a P2P mesh network comprising any number of peers. This dashboard provides a holistic view of the P2P mesh network as a whole as well as the option to provide highly granular information for each peer in the network.

Beneficially, the dashboard can display not only which peers are present in the P2P mesh network but also other information. That information includes, but is not limited to, information as to how those peers are connected to the network, how often those peers communicate with the network, and information about each peer's platform, software development kit (SDK) data, and customer information.

The dashboard can beneficially be used to craft MDM commands to one or more peers in the P2P mesh network. Optionally, a number of peers can be grouped together. The dashboard can be used to generate an MDM command that is applicable to each peer in that group, such that a group command can be generated. Not only can the dashboard be used to generate MDM commands for specific devices or groups of devices, but the dashboard can also be used to generate an MDM command for all of the peers in the network. Thus, the dashboard provides a centralized platform that enables administrators to perform device management operations for peers included in a P2P mesh network.

The dashboard can also optionally be used to help locate peers that may be lost. Peers can also still provide data for display in the dashboard even if some of those peers are not connected to the Internet.

Even further, the dashboard can operate in an agnostic manner with regard to the peers. What this means, then, is that any type of peer using any type of operating system can be included in the P2P mesh network and can be monitored and controlled via the dashboard.

As described above, in addition to displaying information about the various peers, the dashboard may also be configured to provide a centralized location to perform MDM operations. That is, different MDM commands can be generated directly from the dashboard. The dashboard can be used to target specific devices, or even perhaps all of the devices, and an MDM command can be transmitted to those devices. In this regard, the dashboard not only provides an easy and intuitive interface for identifying the peers in the P2P mesh network but it also provides a centralized hub through which those devices can be controlled using various MDM commands.

Advantageously, the embodiments provide a tool that allows users or administrators the option to remotely manage the devices that are included in a P2P mesh network, even if some of those devices do not have access to the Internet or some other wide area network. Stated differently, the disclosed dashboard can be used by administrators to push various different commands to the peers in the P2P mesh network, even if one or more of those peers is not connected to the Internet. Accordingly, these and numerous other benefits will now be described in more detail throughout the remaining sections of this disclosure.

Example P2P Mesh Networks

Attention will now be directed to FIG. 1, which illustrates an example of a P2P mesh network 100. In this example scenario, the P2P mesh network 100 includes a service 105 operating in a cloud 110 environment.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine.

As used herein, reference to any type of machine learning or artificial intelligence may include any type of machine learning algorithm or device, convolutional neural network(s), multilayer neural network(s), recursive neural network(s), deep neural network(s), decision tree model(s)

(e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Service 105 can also be referred to as a so-called "big peer" in the P2P mesh network 100. Further details regarding the functionality of service 105 will be provided later, but by way of an initial introduction, service 105 is tasked with performing various MDM operations with one or more dashboards. Such operations include, but certainly are not limited to, collecting information sent from its various peers, analyzing that information, and issuing commands back to its various peers. As used herein, the term "peer" refers to any computing device that forms a part of the P2P mesh network 100.

Service 105 can have any number of peers. For instance, FIG. 1 shows a few example peers, as indicated by the following: smart phone 115, Internet of Things (IOT) device 120, IOT device 125, IOT device 130, tablet 135, mobile device 140, mobile device 145, and IOT device 150.

It should be noted how the P2P mesh network 100 is agnostic with regard to the different types of devices and those devices' operating systems. For instance, smart phone 115 may be a phone operating an iOS operating system while tablet 135 may be a device operating an Android operating system. Other devices included in the P2P mesh network 100 may include laptops, desktops, or even servers, and those devices may also implement different operating systems. As a result, the P2P mesh network 100 is agnostic relative to device type and operating system type.

Additionally, as shown in FIG. 1, the P2P mesh network 100 can include any number of IOT devices. As used herein, an "IOT device" is a type of device that is often considered to be nonstandard yet it can connect to a network, whether via a wireless connection or a tethered connection. It is often the case that an IOT device includes a sensor to collect various readings, and the IOT device transmits data generated by the sensor to another node or computing device. IOT devices are often used in equipment (e.g., such as the air conditioner unit represented by IOT device 120), meters or junction boxes (e.g., such as the junction box represented by IOT device 125), appliances (e.g., such as the refrigerator represented by IOT device 130 and such as the washer/drier represented by IOT device 150), and other devices, without limit.

As will be described in more detail shortly, each peer in the P2P mesh network 100 includes a client application running on that peer. This client application enables the peer to join the P2P mesh network 100 and to provide various other features and functionalities, such as pushing data to the service 105 and receiving data or commands from the service 105. In some embodiments, the client application incorporates one or more components of an SDK that enable the client application developer to quickly and easily add P2P mesh network connectivity.

Not all of the peers in the P2P mesh network 100 are "directly" connected to the service 105. To illustrate, smart phone 115 and tablet 135 are the only two peers that are considered to be "directly" connected to the service 105. As used herein, the term "directly" should be viewed as referring to a scenario where a first peer is connected to a second peer, and there is no proxy or intermediate peer between the first and second peers. With reference to FIG. 1, service 105 can be considered a first peer and smart phone 115 can be considered a second peer. In this exemplary embodiment, there is no intermediary peer between the service 105 and the smart phone 115.

It may be the case, however, that there are other intervening computing nodes or devices that exist between the smart phone 115 and the service 105. For instance, any number of routers, switches, gateways, E-UTRAN Node Bs, or other computing entities may exist between the smart phone 115 and the service 105, and these other computing entities are used to facilitate communications between the service 105 and the smart phone 115. Two peers can still be considered as being "directly" connected to one another even if other, non-peer devices are logically disposed between those two peers.

For instance, smart phone 115 may be using a telecommunications network (e.g., perhaps a 3G network, 4G network, 5G network, etc.) to communicate with the service 105, which resides in the cloud 110. That telecommunications network includes a base station, a controller, and a core network. The smart phone 115 may communicate with the service 105 via the base station, the controller, and the core network, yet the smart phone 115 is still considered to have a "direct" connection to the service 105 because those intervening computing elements do not include the client application mentioned earlier and thus are not peers. More particularly, those intervening computing entities do not have the client application; thus, a scenario in which one peer is "directly" connected to another peer refers to a scenario where there are no intervening peers, though there may be other intervening, non-peer computing entities. To be a peer, the device has the P2P network-enabled client application installed thereon.

As another example, tablet 135 should be considered as being directly connected to service 105 inasmuch as no intervening peers exist between tablet 135 and service 105. In contrast to smart phone 115 and tablet 135, the IOT devices 120, 125, 130, 150 and mobile devices 140 and 145 are not directly connected to the service 105. For instance, smart phone 115 is an intermediary peer between IOT devices 120, 125, and 130 and the service 105. Similarly, tablet 135 is an intermediary peer between mobile devices 140 and 145 and the service 105. Regarding IOT device 150, two intermediary peers exist between IOT device 150 and the service (e.g., see tablet 135 and mobile device 145).

There may be a variety of reasons as to why an intermediary peer exists between two other peers. For instance, smart phone 115 is a type of device that includes functionality for using a telecommunications broadband network to connect to the cloud 110. IOT device 120, on the other hand, may not have a similar kind of functionality; instead, IOT device 120 may be configured to include only a local area network (LAN) connection, a Bluetooth connection, or any other near field connection. Stated differently, it may be the case that IOT device 120 does not include the ability to connect to a wide area network (WAN), such as the Internet.

Despite IOT device 120 not having the functionality to connect to the cloud 110 (or perhaps it has the functionality, but the functionality is not currently active), the IOT device 120 can still be included in the P2P mesh network 100 and can still communicate with the service 105 in the cloud 110 via an indirect mechanism, e.g., via the smart phone 115. To illustrate, IOT device 120 may have a Bluetooth connection with the smart phone 115, and the smart phone 115 may have a telecommunications broadband connection with the service 105. Smart phone 115 can thus operate as an intermediary peer to receive information from the IOT device 120 via the Bluetooth connection and to pass that information to the service 105 via the telecommunications broadband connection. Similarly, smart phone 115 may receive information from the service 105 via the telecommunications broadband connection and pass that information to the IOT device 120 over the Bluetooth connection. Similar arrangements can be made for the IOT devices 125, 130, and 150 as well as the mobile devices 140 and 145.

It is worthwhile to note that the disclosed P2P mesh networks can optionally operate using an underlying database that can be configured to support any type of operation involving the use of conflict-free replicated data types (CRDT). As used herein, a CRDT refers to a data structure that has certain properties. Those properties include the ability of a unit of data to be replicated across different devices in a network. The properties also include a property in which a replica of an application can be updated independently, concurrently, and even without coordination with other replicas. Another property of a CRDT is that inconsistencies can be automatically resolved. Yet another property of a CRDT is that the replicas of the application are configured in such a manner that there is a guarantee that those replicas will eventually converge. Accordingly, the disclosed P2P mesh networks can use CRDT data structures to operate. In some implementations, traditional key: value pair types of databases can also be used, such as perhaps alongside of the CRDT implementations.

Figure 2:
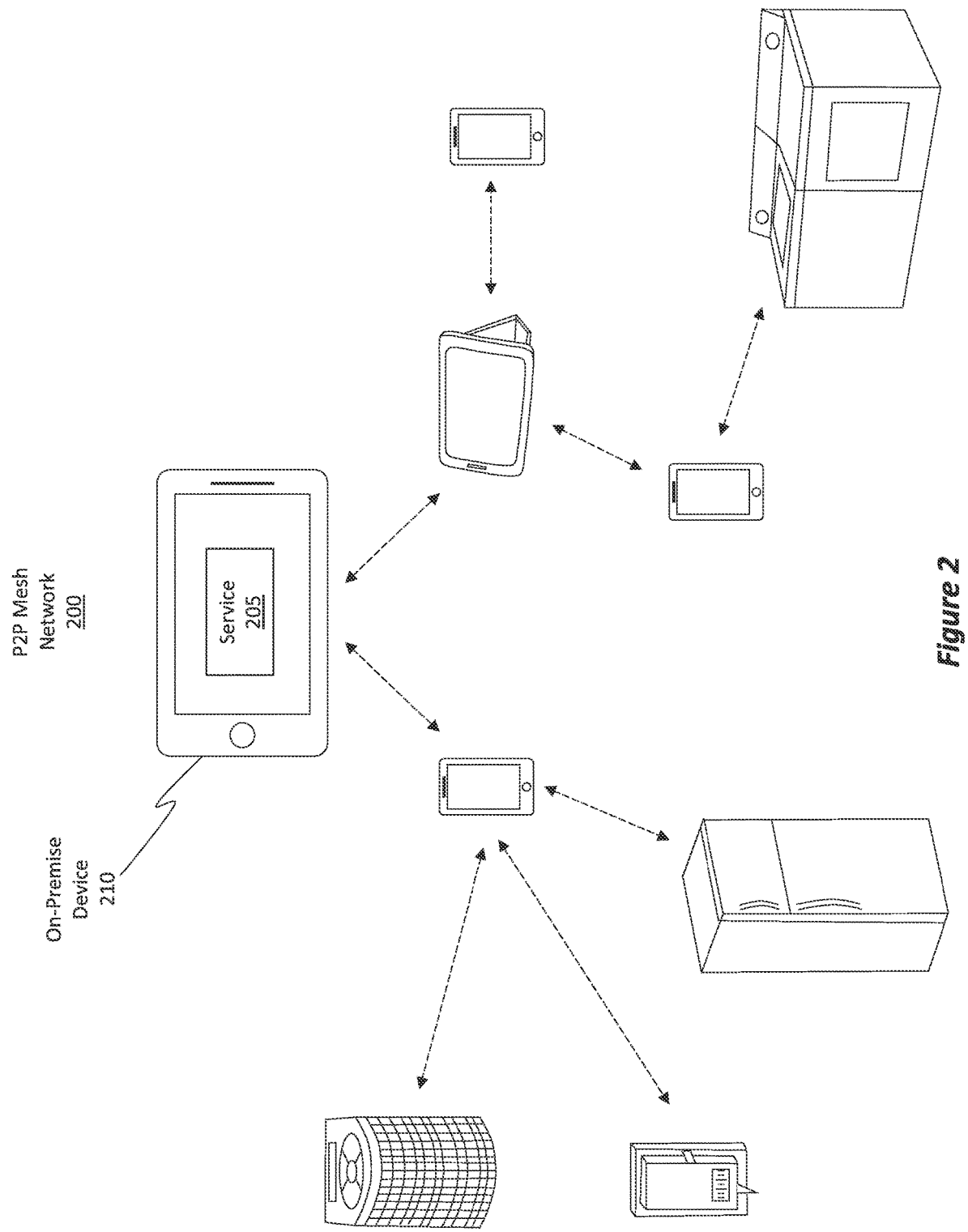
FIG. 2 illustrates an example of a so-called "small peer" (i.e. the service, as it operates on an on-premise or mobile device) operating in a P2P mesh network.

FIG. 2 shows a similar P2P mesh network 200 as was shown in FIG. 1 with the exception that the service 205 is now residing on an on-premise device 210. Because service 205 is residing on a non-cloud based device, service 205 can be considered a "small peer" whereas service 105 can be considered as a "big peer" because service 105 is operating in the cloud.

More particularly, whereas service 105 of FIG. 1 resided in the cloud 110, service 205 can reside on the on-premise device 210. By "on-premise," it is meant that the device 210 is not a server operating in the cloud, the Internet, or any other WAN. Rather, the device 210 may be a device operating on a LAN or may be a device that is physically proximate to one or more of its peers. More generally, the on-premise device 210 can be viewed as being any type of device provided it is not a server operating in a data center that forms a part of the cloud environment.

Thus, the on-premise device 210 should be viewed as being a device that is within a threshold distance, either physically or logically, relative to the other peers in the P2P mesh network 200. Service 105 of FIG. 1, on the other hand, is being implemented by a server residing in a data center forming a part of the cloud 110.

Client Application

Figure 3:
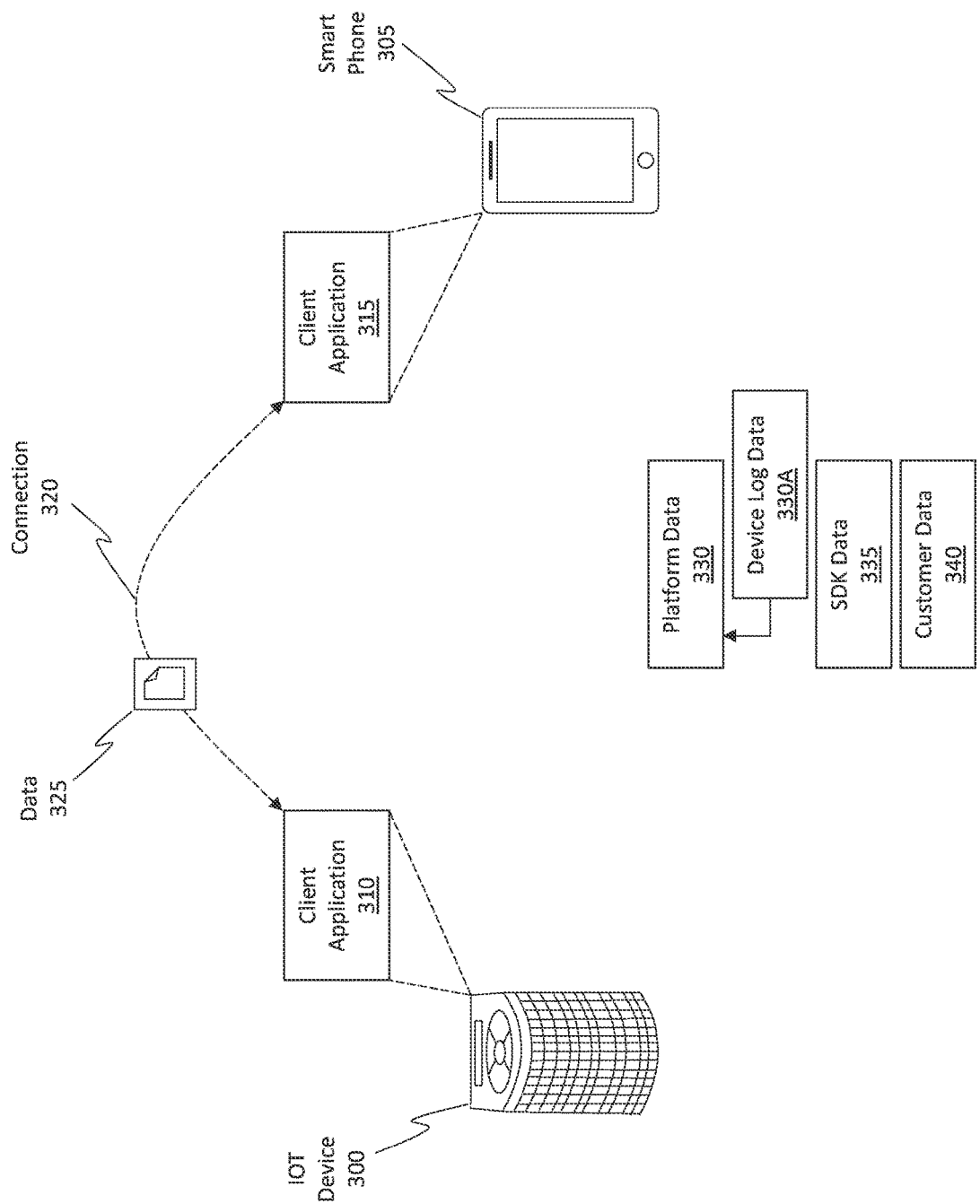
FIG. 3 illustrates how a client application is used to enable peers to join a P2P mesh network.

FIG. 3 provides more details regarding the client application mentioned previously. FIG. 3 shows an IOT device 300, which is representative of the IOT device 120 of FIG. 1, and a smart phone 305, which is representative of the smart phone 115. IOT device 300 implements a first instance of a client application, as shown by client application 310. Similarly, smart phone 305 is shown as implementing a second instance of the client application, as shown by client application 315.

The client applications 310 and 315 refer to applications that enable the peers in the P2P mesh network to connect to one another and to optionally provide the CRDT functionality mentioned earlier. The client applications also enable the various peers to receive and send information from one peer to another peer, including a big peer residing in the cloud environment (e.g., service 105) or a small peer residing on an on-premise device. These client applications may optionally be on any type of device with any type of operating system with P2P mesh network connectivity implemented using an appropriate SDK.

A connection 320 is formed between the IOT device 300 and the smart phone 305. Connection 320 can be formed via an transport mechanism, such as, but not limited to, any type of Bluetooth connection, Bluetooth low energy connection, LAN connection, wireless fidelity (Wi-Fi) connection, universal serial bus (USB) connection, telecommunications connection, and so on. Data 325 can be passed between the IOT device 300 and the smart phone 305. Often, data 325 includes one of at least three different types of data. These data types include (i) platform data 330, which can include device log data 330A, (ii) SDK data 335, and/or (iii) customer data 340.

Platform data 330 refers to any type of data describing a peer's platform. For instance, platform data 330 can include a peer's friendly name, the peer's operating system data, the peer's device characteristics (e.g., processor data, memory data, bandwidth data, etc.), or any other type of data related to the features and functionality of the peer's operating system and device characteristics. Platform data 330 can also optionally include the device log data 330A. The device log data 330A can include any type of activity data generated or monitored by the peer. This information can include device or application connections, errors, authentication events, and so on.

SDK data 335 refers to the features and attributes of the SDK utilized within the client application installed on the peer (e.g., client application 310 or client application 315). For instance, IOT device 300 may have one version of the client application while smart phone 305 may have a different version of the client application. SDK data 335 includes any details related to the version or operation of SDK components in a client application on a peer.

A client application, such as in the form of an SDK, can also be used to help a user develop his/her own client application. For instance, client application 310 or 315 can optionally provide an integrated development environment (IDE) for developing applications. Customer data 340 refers to data describing the application that is being developed by the user using the client application 310 or 315. Customer data 340 can include any type of error message, compiling data, runtime data, telemetry data, and so on, without limit. Optionally, the various different peers in the P2P mesh network can be configured to push their platform data 330, SDK data 335, and/or customer data 340 through the P2P mesh network to the service (e.g., service 105 of FIG. 1) at a predefined frequency, such as perhaps every "x" number of minutes, hours, or days. As will be described in more detail, different priority levels may be assigned to this pushed data. Additionally, the various peers may receive an asynchronous request from the service to provide the service with current data. It may be the case that a high priority assignment may be given to that operation.

Transmitting Data Through the P2P Mesh Network

Figure 4:
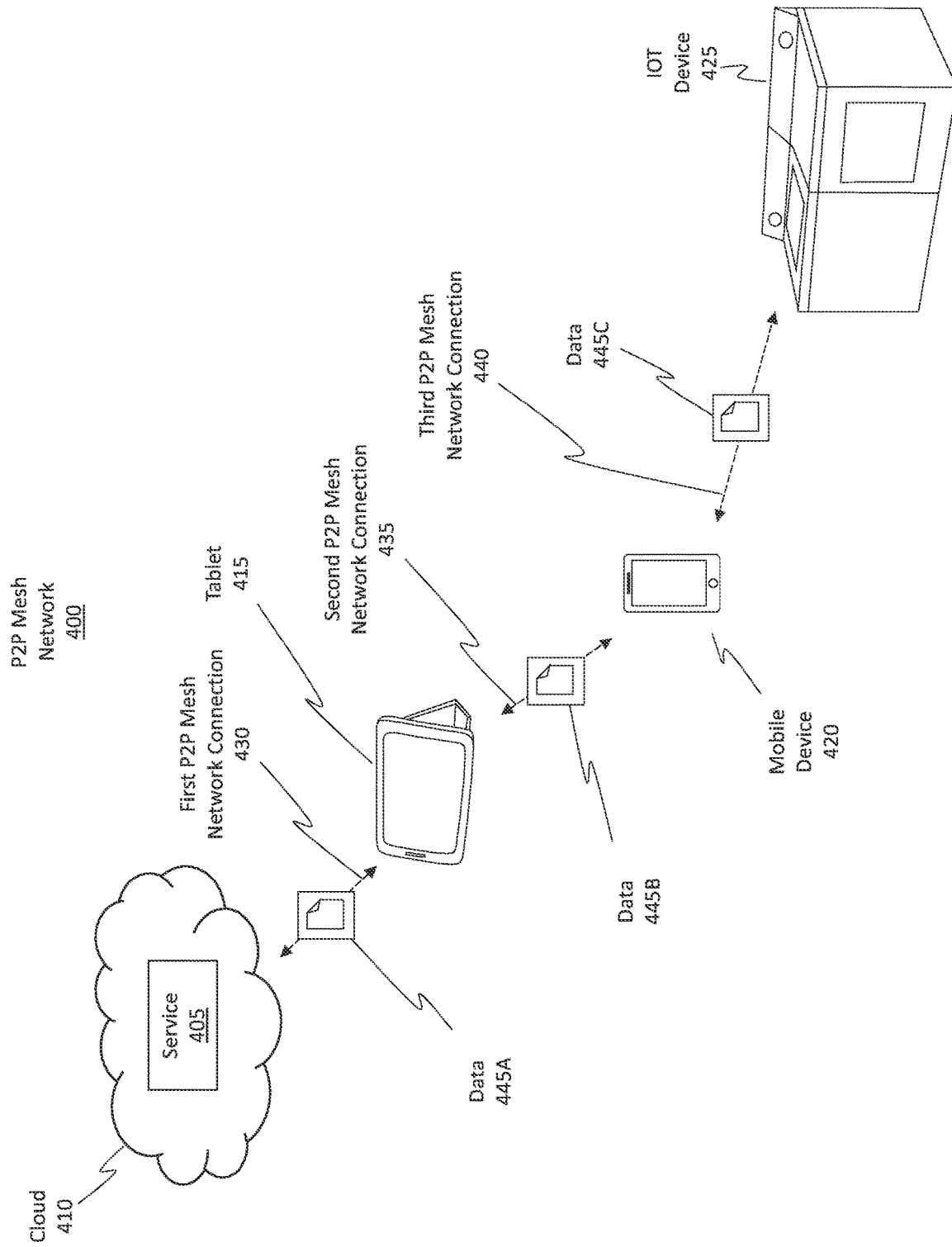
FIGS. 4 and 5 illustrate how data can be transmitted through any number of intermediary peers to reach a peer that is not directly connected to the big peer or small peer.

FIG. 4 shows an example P2P mesh network 400 that is similar to the networks described previously. P2P mesh network 400 is being used to transmit data from a big peer to another peer, or vice versa.

P2P mesh network 400 includes a service 405 residing in a cloud 410 environment. As before, the service 405 can be considered as being the big peer.

P2P mesh network 400 further includes other peers, as shown by tablet 415, mobile device 420, and IOT device 425. In this example scenario, the IOT device 425 is sending and/or receiving information from the service 405. To do so, the IOT device 425 and the service 405 will rely on a number of intermediary peers, such as tablet 415 and mobile device 420.

In this embodiment, a first P2P mesh network connection 430 exists between the tablet 415 and the service 405. A second P2P mesh network connection 435 exists between the tablet 415 and the mobile device 420. A third P2P mesh network connection 440 exists between the mobile device 420 and the IOT device 425. These various P2P mesh network connections are used to transmit data between the service 405 and the IOT device 425. For instance, data 445A is being transmitted from the service 405 to the tablet 415 via the first P2P mesh network connection 430. Data 445A is intended for the IOT device 425. Data 445B is representative of data 445A as that data is being passed from the tablet 415 to the mobile device 420 via the second P2P mesh network connection 435. Data 445C is representative of data 445B as that data is being passed from the mobile device 420 to the IOT device 425. IOT device 425 receives the data and can optionally transmit data back to the service 405 using the reverse of the process just described.

Figure 5:
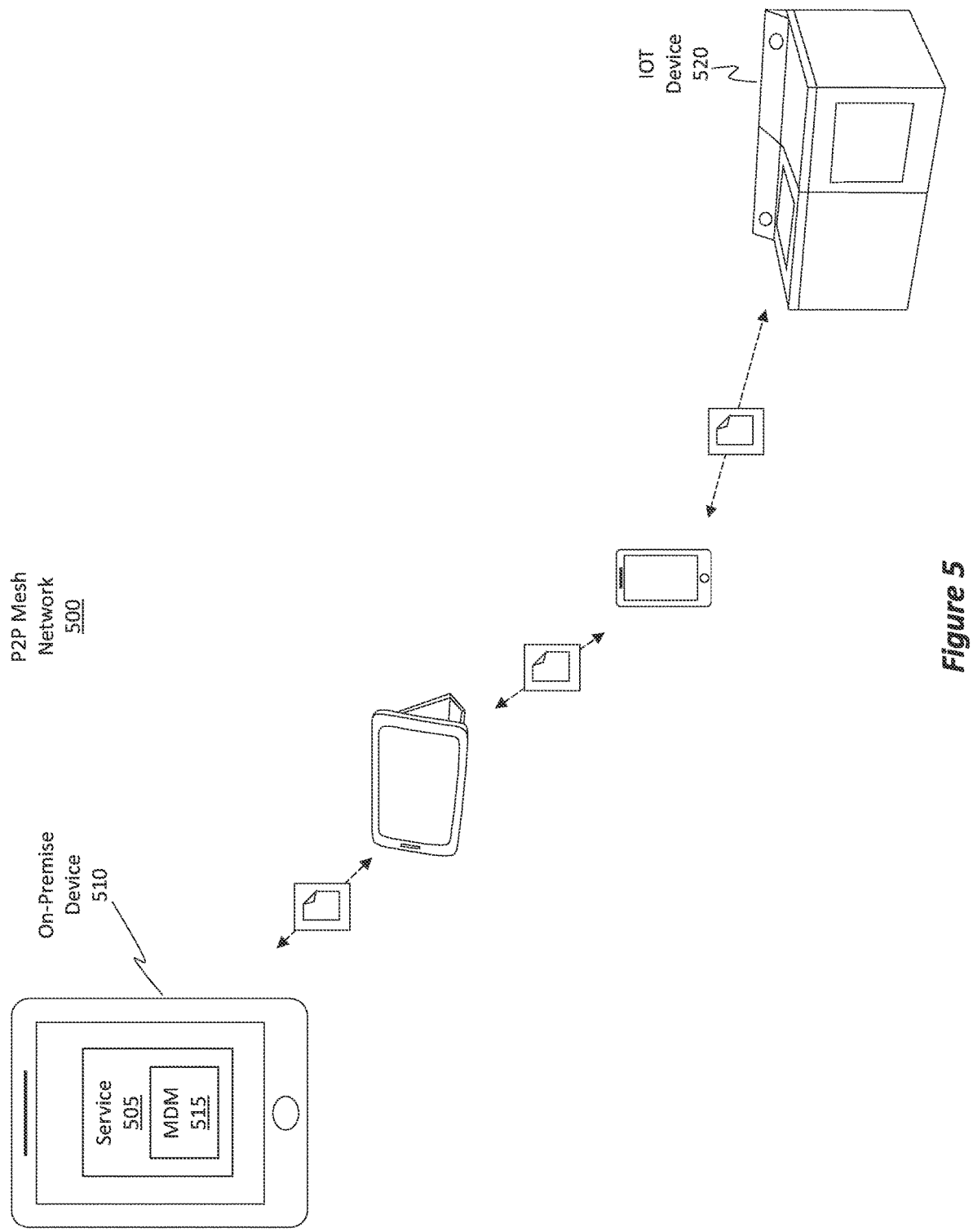

FIG. 5 shows a similar P2P mesh network 500 as the one described in FIG. 4 with the difference that now a small peer is being used. In particular, P2P mesh network 500 includes a service 505 operating on an on-premise device 510. Service 505 is a service that includes a mobile device management (MDM) 515 platform used to manage the peers in the P2P mesh network 500. Using similar techniques as the ones just described, service 505 can send and receive data with an IOT device 520 via use of any number of intermediary peers.

Dashboard

As described above, the disclosed embodiments can collect data from the various peers included in a P2P mesh network. The service is able to aggregate that information and compile it into a database. This database can then be displayed to a user in the form of a dashboard via a graphical user interface. The dashboard provides a user with the option to not only view which devices are included in the P2P mesh network but also to view information associated with that devices. That information can include, but is not limited to, the platform data (e.g., platform data 330 from FIG. 3), SDK data (e.g., SDK data 335), customer data (e.g., customer data 340), connection data detailing how the peers are connected to one another, and even data describing how often a peer is "seen" by the service. The term "seen" refers to a time when the service last received updated information from a peer.

All of this detailed information can be compiled and displayed in the dashboard. Notably, this dashboard is provided for a network that is specifically structured as a peer-to-peer network, which may include devices that are not connected to the Internet.

The dashboard can also be used to facilitate various MDM operations. Furthermore, specific devices can be selected from within the dashboard, and those selected devices can be targeted for specific MDM operations. Further details on the MDM operations will be provided later.

Figure 6:
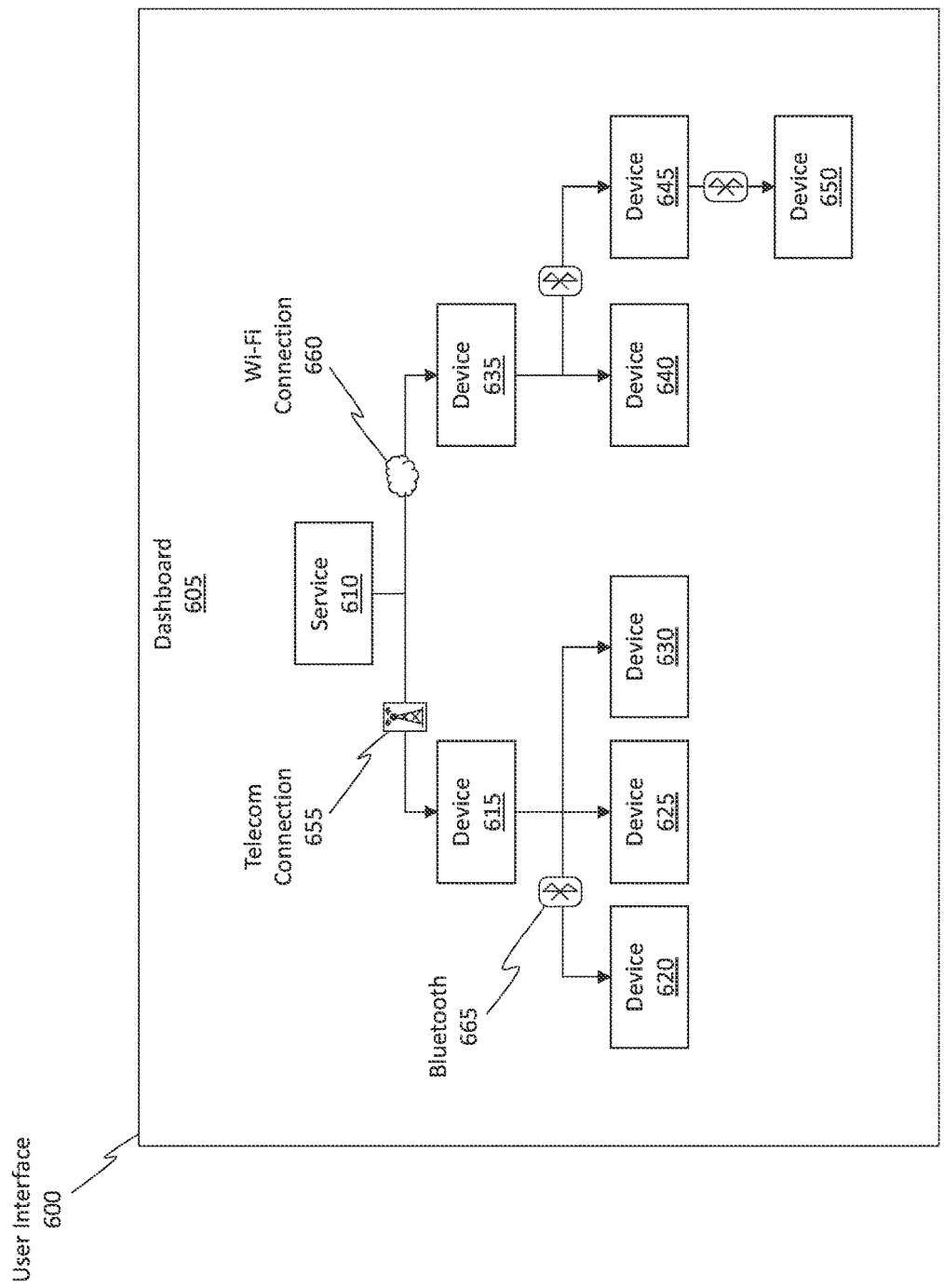
FIG. 6 illustrates an example of a dashboard that can be generated for a P2P mesh network.
Figure 7:
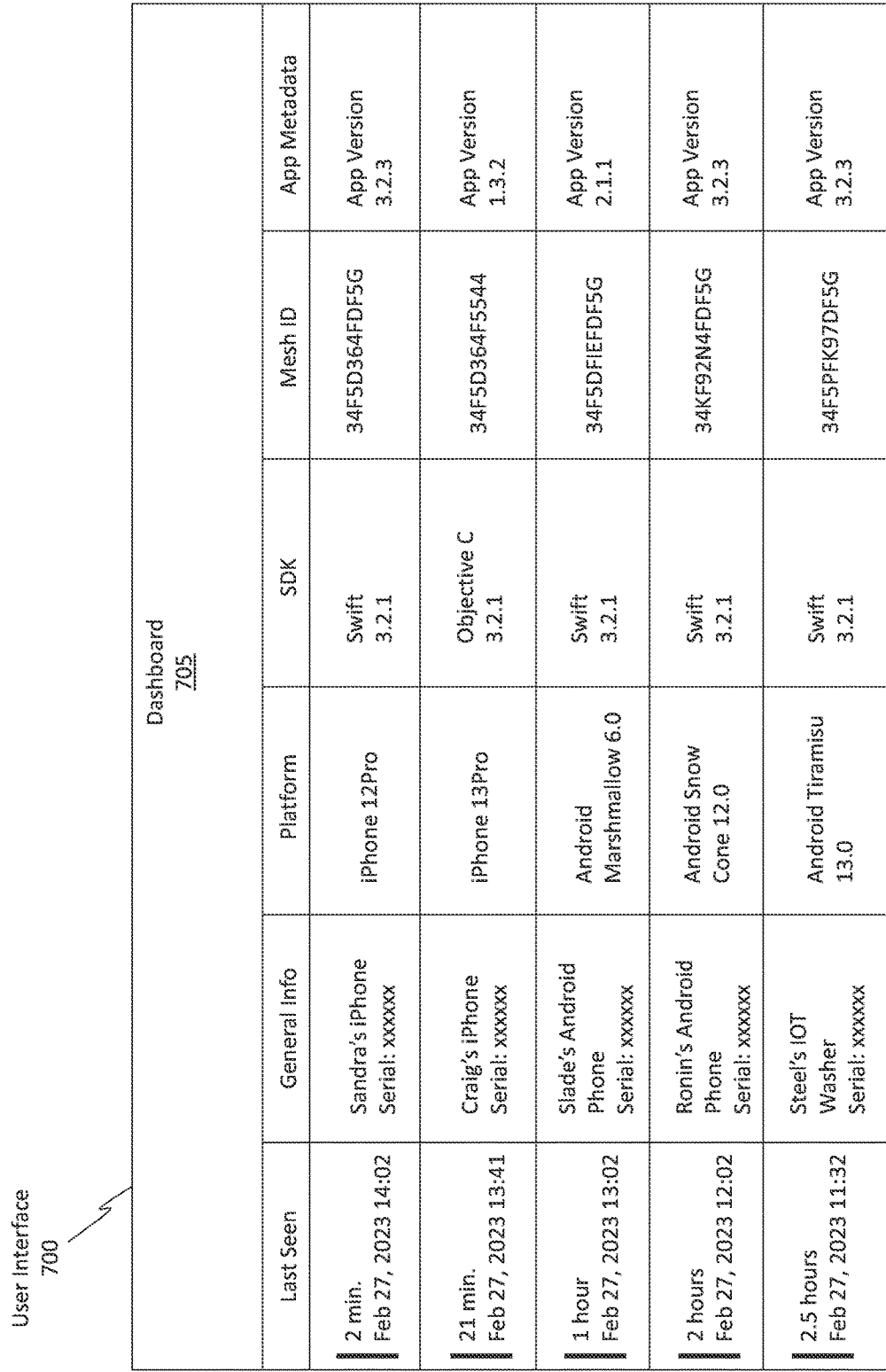
FIG. 7 illustrates another example of a dashboard.

FIGS. 6 and 7 illustrate different implementations for a dashboard corresponding to the P2P mesh network 100 of FIG. 1. In particular, FIG. 6 shows an example user interface 600 comprising a dashboard 605. Dashboard 605 is providing a display that reflects the devices included in the P2P mesh network 100.

To illustrate, dashboard 605 shows a service 610 and devices 615, 620, 625, 630, 635, 640, 645, and 650, which correspond to service 105, smart phone 115, IOT device 120, IOT device 125, IOT device 130, tablet 135, mobile device 140, mobile device 145, and IOT device 150, respectively. Dashboard 605 also illustrates the type of connections or transport protocols that are being used to connect the various different peers. For instance, device 615 is connected to service 610 via a telecom broadband connection 655. Device 635 is connected to service 610 via a Wi-Fi connection 660. Devices 620, 625, and 630 are connected to device 615 via a Bluetooth 665 connection. Although not labeled, devices 640, 645, and 650 also rely on a Bluetooth connection or any type of point-to-point Wi-Fi connection.

Dashboard 605 is able to display user interface elements that represent the type of connection that exists between the peers. For instance, Wi-Fi connection 660 uses a cloud to represent that type of connection. Similarly, telecom connection 655 uses a transmission line to represent that type of connection.

FIG. 6 shows a mapped version of the various different peers in the P2P mesh network. Selection of a particular peer in the map or hovering a cursor over that peer can trigger the display of additional information, such as any of the platform data, SDK data, and/or customer data, among other things.

FIG. 7 shows a table view of a dashboard. In particular, FIG. 7 shows an example user interface 700 comprising a dashboard 705. Dashboard 705 can be configured to include any of the platform data, SDK data, and/or customer data mentioned previously. Dashboard 705 can also include information related to the connectivity between a peer and the service, such as a time when the peer was last "seen" by the service. The dashboard 705 includes any type of sorting or filtering features to sort or filter the data displayed in the dashboard 705. The dashboard 705 also supports any type of query command used to identify peers or characteristics of peers. The dashboard 705 also supports grouping operations in which multiple peers are assigned to a common group.

More particularly, dashboard 705 is shown as including several columns of unique information. These columns include the following example headings: last seen, general info., platform, SDK, mesh ID, and app metadata. The last seen heading refers to a timestamp indicating when the service last received updated information from a peer in the network. The general info. refers to identifying information for a peer, such as that peer's network friendly name and that peer's serial number as well as perhaps the make and model of the peer.

The platform heading refers to information detailing the attributes of the peer, such as the peer's operating system, processor capability, memory, and so on. The SDK heading refers to information about the client application installed on that peer. The mesh ID refers to information used to uniquely identify a peer within the P2P mesh network. The app metadata refers to some customer information related to an application that is being developed or deployed using the client application. Accordingly, the dashboard 705 can be used to visualize information about the peers in a P2P mesh network.

Figure 8:
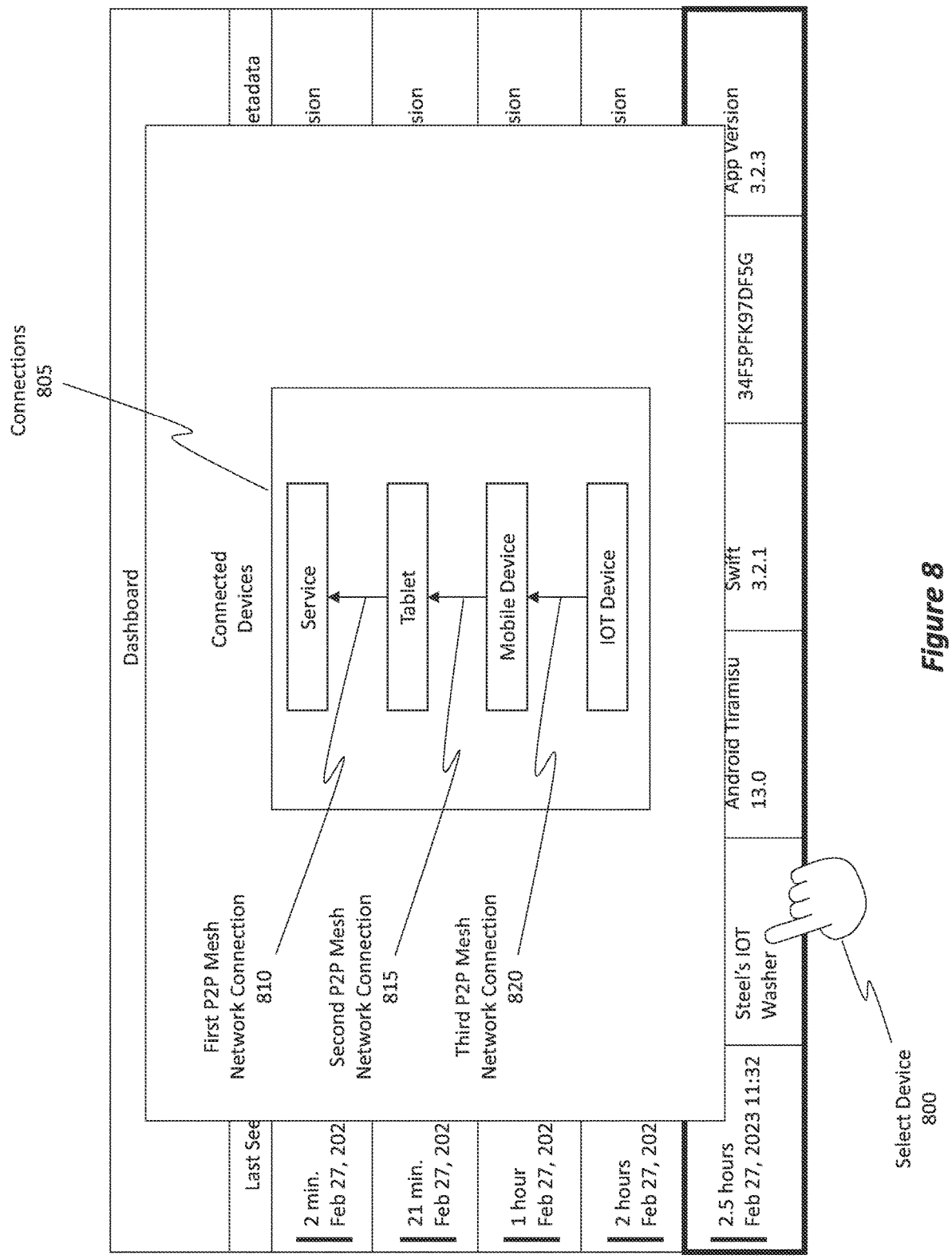
FIG. 8 illustrates various features of the dashboard.

The dashboard can be used to visualize other information as well, such as the connections that exist to enable one peer to connect to the service. For instance, FIG. 8 shows a scenario where a user has selected one of the peers listed in the dashboard, as shown by select device 800. The device that was selected has a friendly name of "Steel's IOT washer," and this device corresponds to the IOT device 150 from FIG. 1. In response to that selection, the dashboard displayed the connections 805 that exist to enable the selected peer to communicate with the service.

For instance, this device is an IOT device that is connected to a mobile device, which is connected to a tablet, which is connected to the service. The connection between the service and the tablet is labeled as first P2P mesh network connection 810. The connection between the tablet and the mobile device is labeled as second P2P mesh network connection 815. The connection between the mobile device and the IOT device is labeled as third P2P mesh network connection 820. These connections are also illustrated in FIG. 1 as the connections between the service 105, the tablet 135, the mobile device 145, and the IOT device 150. Optionally, the dashboard can further display the specific type of connection that exists between the peers (e.g., Wi-Fi, telecom broadband, USB, Bluetooth, etc.).

Controlling Peers Through Use of the Dashboard

Figure 9:
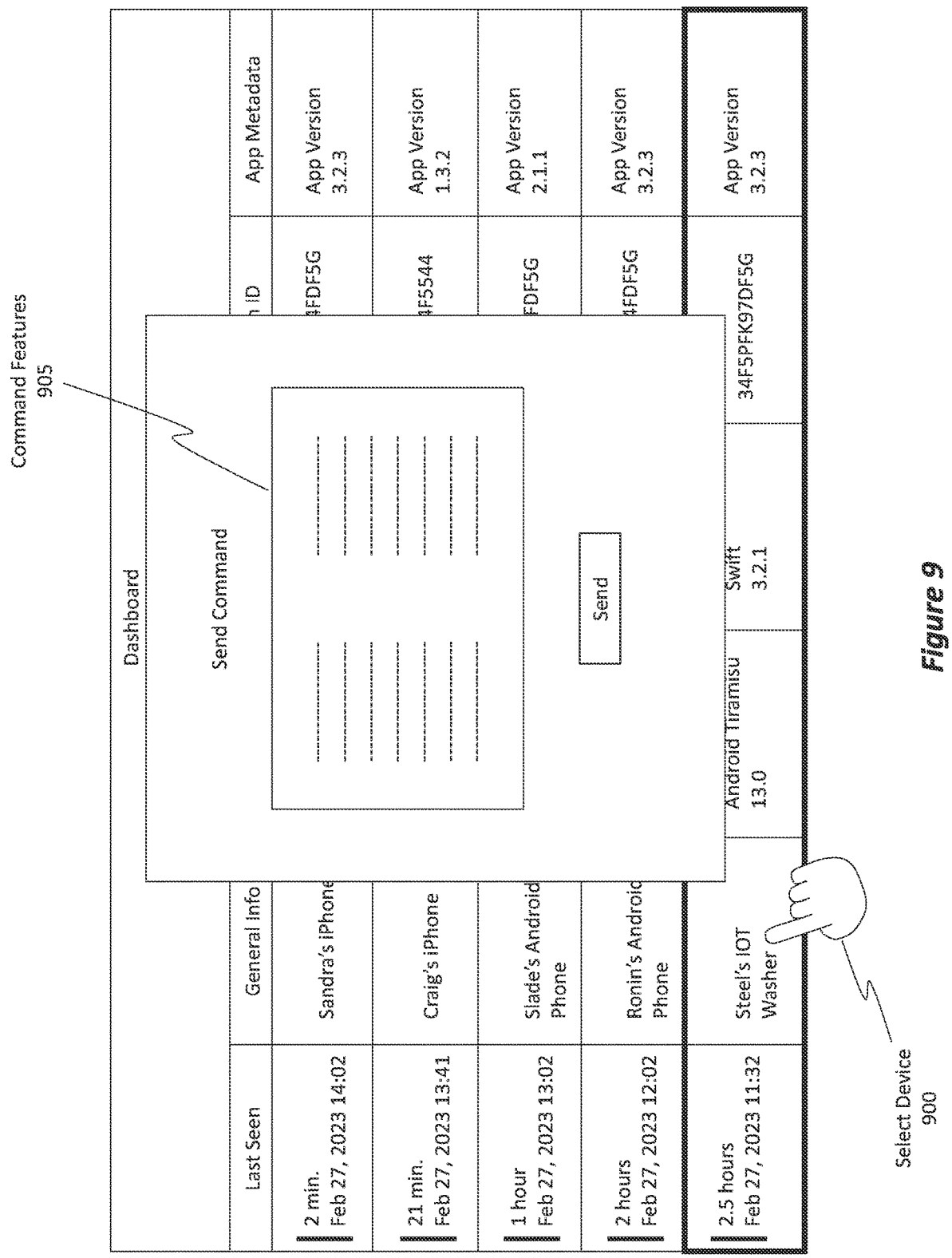
FIG. 9 illustrates other features of the dashboard.
Figure 10:
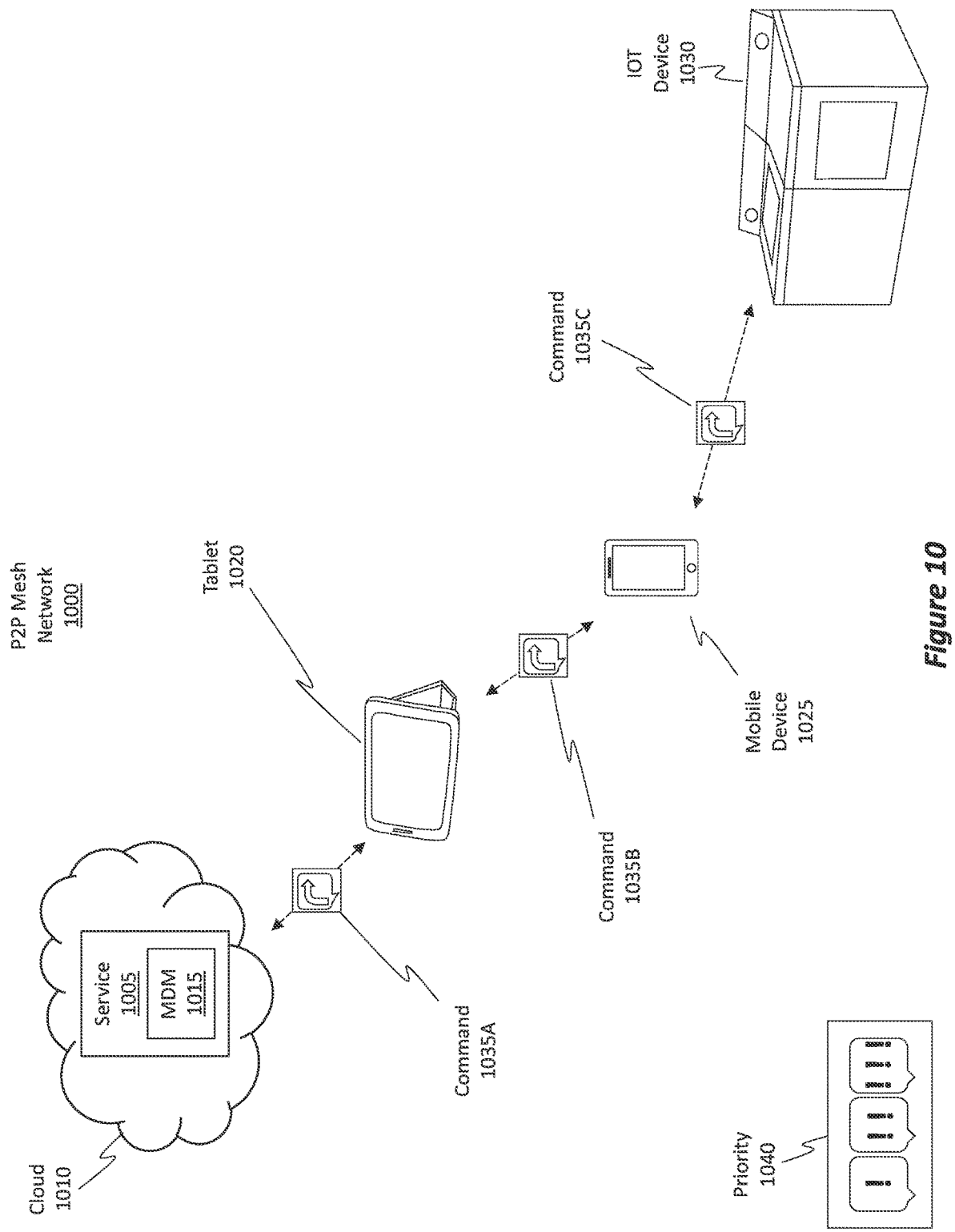
FIG. 10 illustrates how a mobile device management (MDM) command can be transmitted to a peer from the dashboard.
Figure 11:
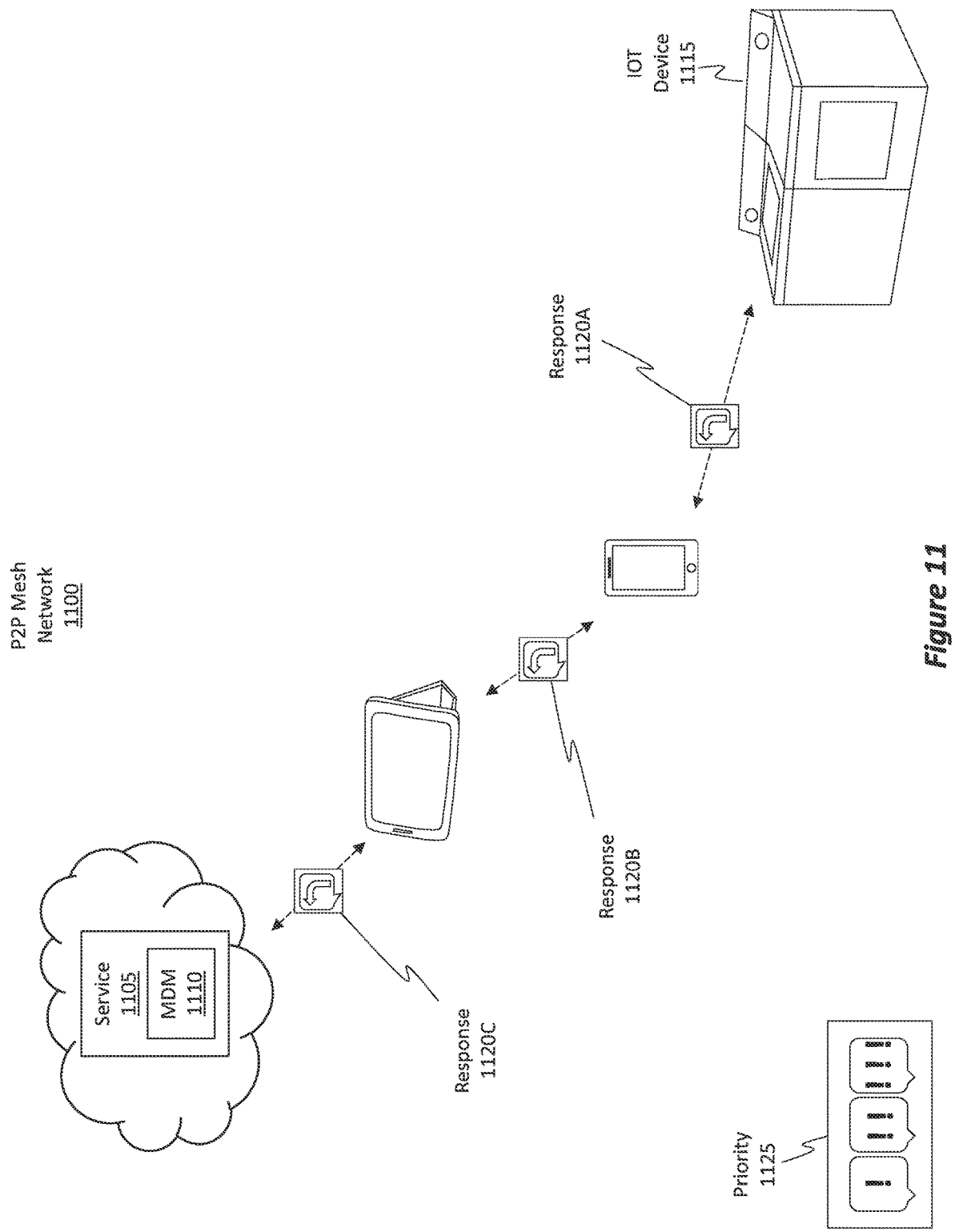
FIG. 11 illustrates how a response to the MDM command can be transmitted to the big peer, and that response can be displayed in the dashboard.

In accordance with the disclosed principles, the dashboard may be configured to facilitate the control of the various peers in the P2P mesh network via any number or type of MDM commands. As used herein, an MDM command is a type of command in which a device receives an instruction from a remote entity, and that instruction causes the device to execute certain actions or to perform certain queries. FIGS. 9, 10, and 11 are illustrative.

FIG. 9 shows a scenario where one of the peers in the P2P mesh network is selected, as shown by select device 900. In response to that selection, the dashboard can trigger the display of a command interface to enable a user to specify the features or attributes of a command to be sent to the selected device, as shown by command features 905. By way of example, the commands (e.g., MDM commands) can include a command to change a log level of an application that is running on the selected device. The log level refers to the different types of data that may be logged, such as warnings, errors, debugging information, and so on. It is often the case that the default logging level is set to log only errors. It may be desirous, however, to log more information, such as the warnings or debugging information. Thus, the embodiments can cause a command to be sent to a peer to change the log level for an application. Changing the log level to include more information can help with a troubleshooting process.

As another example, the MDM command can be a command to wipe the selected device, such as when the device is determined to be a rogue device or when the device was used by a former employee or consultant. As another example, the MDM command can be a command to revoke a security certificate on the selected device. As yet another example, the MDM command can be a command to catalog a customer application version of the application that is being developed or that is executing on the selected peer. The MDM command can also be a command that updates various features or applications on the selected peer. That is, the dashboard can be used to update an application version on a peer in the mesh network. Thus, the application can be updated in a remote manner and through a P2P network. In some cases, one or more previous versions and a new or updated version of an application can remain on a device. What this means is that the embodiments can optionally trigger an application to roll back to a prior version. Thus, the dashboard can be used to not only update an application but it can also be used to roll back an application to a prior version. Such operations can be performed or managed entirely from the dashboard for the P2P network. Additionally, as described herein, the device can be updated and/or rolled back even if the device is not directly connected to the Internet. Instead, the communications can travel from one peer to another until the end destination is reached.

Another MDM command can be the retrieval of log data from a peer. Optionally, a customer or user of that peer can provide additional information as a part of the log or as a supplement to the log to assist in troubleshooting a potential problem the customer is facing.

FIG. 9 shows a scenario where a single peer is being selected. It should be appreciated, however, how multiple peers can be selected and/or joined to a group. Notably, this group can be formed even if the peers are using different operating systems. The user can use the dashboard to then generate an MDM command that will be sent to those peers in the group. Notably, after the command parameters are generated, the embodiments can then further customize the command so it is operable on the different operating systems of the peers. An example will be helpful.

Suppose a group consisted of three peers. The first peer is an iOS device, the second peer is an Android device, and the third peer is an IOT device using a particular OS. The user can craft a generalized MDM command for the group as a whole without having to specify certain aspects or customizations related to those three different operating systems. In this example, the MDM command might be a command to cause those peers to provide current log data. The embodiments receive the parameters of the user's MDM command and then generate customized commands. For instance, a first customized command is generated for the iOS device, a second customized command is generated for the Android device, and a third customized command is generated for the IOT device. Each of these commands is customized to be executable on its respective peer/device.

Thus, the embodiments are able to receive a set of command parameters from the user via the dashboard, and the embodiments can then formulate customized commands to implement the objective the user provided in the dashboard. Such operations can be performed on the backend such that they are abstracted away from the user. Now, the user need not have to worry about generating iOS specific commands or Android specific commands. The embodiments are able to automatically generate the commands based on the known characteristics of the peer. Similar operations can be performed if a command is destined for implementation by all of the peers in the network.

FIG. 10 shows an example P2P mesh network 1000 comprising a service 1005 in a cloud 1010, where the service 1005 includes an MDM 1015 component used to control the behavior of the peers in the P2P mesh network 1000 by issuing commands to those peers. Those commands can be constructed and triggered for transmission using the dashboard shown in FIG. 9. The P2P mesh network 1000 includes a tablet 1020, a mobile device 1025, and an IOT device 1030. In this example scenario, a command has been constructed for the IOT device 1030 to execute.

To illustrate, service 1005 generates a command 1035A and sends that command to the IOT device 1030. In this example scenario, however, the IOT device 1030 is not directly connected to the service 1005, so a number of intermediary peers are used to facilitate the transmission of the command 1035A from the service 1005. More particularly, the command 1035A is sent from the service 1005 to the tablet 1020. The tablet 1020 then retransmits that command to the mobile device 1025, as shown by command 1035B. The mobile device 1025 then retransmits that command to the IOT device 1030, as shown by command 1035C.

In some embodiments, the command can be associated with a corresponding or assigned priority 1040. The priority 1040 indicates how urgent the command is to be sent to the IOT device 1030. A higher priority allows the command to usurp additional resources or bandwidth from the peers to facilitate the transmission. For instance, if one of the peers receives two packets, one of which is a higher priority command and the other is a lower priority data transmission, then the peer will transmit the higher priority command first, even if perhaps the lower priority data transmission was received before the higher priority command.

Different commands may have different priority levels. For instance, a command to wipe a device or to cancel a security token on a device may be provided with a very high priority because that device may need to be removed from the P2P mesh network right away to avoid potential malicious behavior. On the other hand, a command to execute a query on one of the peers may be assigned a relatively lower priority.

FIG. 11 shows an example P2P mesh network 1100 comprising a service 1105, which includes an MDM 1110 component, and an IOT device 1115, along with a number of other peers (not labeled). IOT device 1115 is representative of the IOT device 1030 from FIG. 10. In this example scenario, IOT device 1115 has executed the command it received from the service. Now, the IOT device 1115 is tasked with sending a response report back to the service 1105 to detail the results of executing the command. This response is transmitted from the IOT device 1115 to the service 1105, as shown by response 1120A, response 1120B, and response 1120C. Similar to the command, the response can also be assigned a priority 1125 level.

The results of executing the command can optionally be displayed in the dashboard described earlier. Additionally, the dashboard can include an audit log of commands and responses. The audit log can include detailed information regarding the content of the commands and responses as well as timing information as to when the command was sent by the service, when the command was received by the peer, when the command was executed, how long the execution took, when was a response sent by the peer, and when was the response received by the service. The timing information can optionally be used to compute a latency for the P2P mesh network, where the latency is a metric detailing how long it takes for data to pass through the P2P mesh network. The timing information can also include how long the data was delayed at each of the peers as well as which peers were used to transmit the data. All of the above information can optionally be displayed in the dashboard.

Another benefit of the dashboard relates to the ability to potentially find lost or missing devices. For instance, the dashboard can be configured to display which peers a particular device was previously connected with. Optionally, data relating to the location of those peers can be included and displayed in the dashboard. The embodiments can intelligently infer a location for a missing device based on the connection that previously existed between the lost device and its peers. An example will be helpful.

Suppose a climate sensor is a first peer in the P2P mesh network. The climate sensor is connected to a wall-mounted tablet, which is a second peer in the P2P mesh network. The tablet is connected to the service via a Wi-Fi connection, and the tablet is connected to the climate sensor via a Bluetooth low energy connection. Now, suppose the climate sensor is lost.

The embodiments can determine the climate sensor is likely lost or malfunctioning by examining when it was last seen by the service. For instance, if the climate sensor is configured to provide an hourly report to the service, but the last report seen by the service was 5 hours ago, then the embodiments can determine that the climate sensor may be a lost device or perhaps may be a device whose battery has died. An alert can be displayed in the dashboard to inform a user regarding the lack of updated data from the climate device.

The embodiments can inform the user that the climate sensor was connected to the wall-mounted tablet via a Bluetooth low energy connection. Because of this connection, the embodiments can infer that the climate device is likely within a threshold physical distance relative to the wall-mounted device. That threshold distance can be based on the range of Bluetooth low energy.

Optionally, the dashboard can display a map of the environment in which the wall-mounted device and the climate sensor are located. The map can include a circle with a calculated radius, where the circle is centered on the wall-mounted device. The radius corresponds to the estimated distance in which one device can communicate with another device using a Bluetooth low energy connection. This map can be displayed to a user to assist the user in trying to find the climate sensor. Thus, the embodiments can optionally facilitate identifying lost or malfunctioning devices by intelligently analyzing the types of connections that the device has with other peers in the P2P mesh network.

Example Method(s) for Implementing a Dashboard for a P2P Network

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
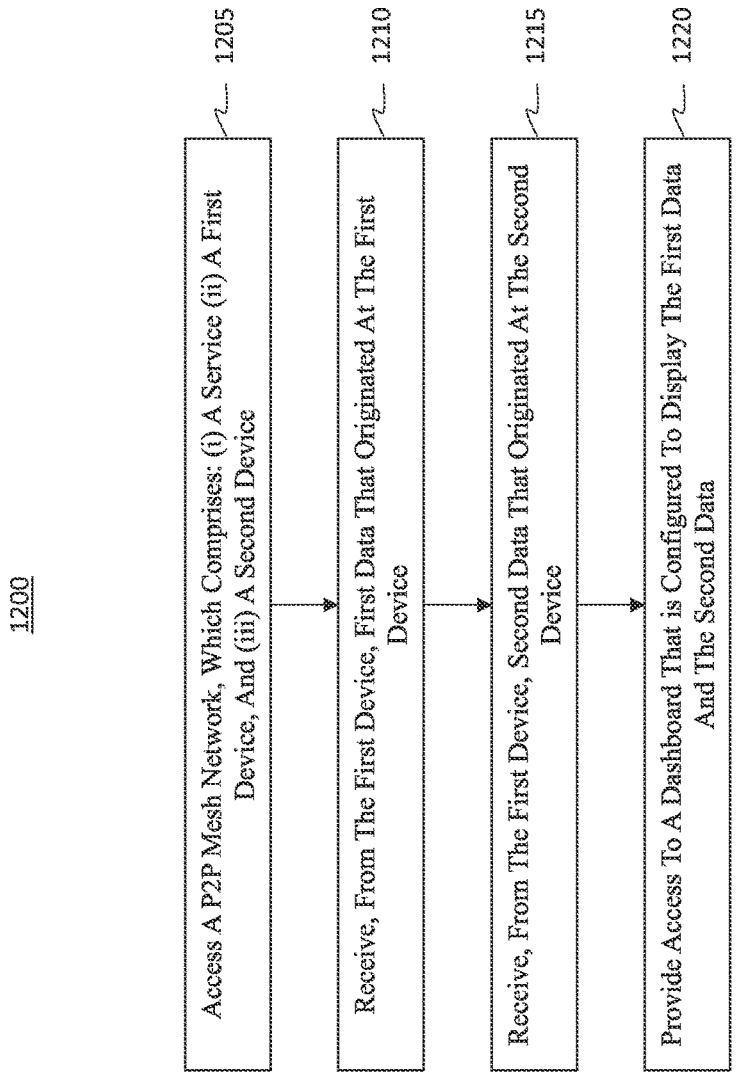
FIG. 12 illustrates a flowchart of an example method for implementing a dashboard for use in a P2P mesh network.

Attention will now be directed to FIG. 12, which illustrates a flowchart of an example method 1200 for implementing a dashboard that displays information describing devices/peers included in a peer-to-peer (P2P) mesh network. Method 1200 can be implemented by a service operating in a wide area network (WAN), such as the service 105 from FIG. 1. Method 1200 can also be implemented by a service operating on an on-premise device, such as service 205 from FIG. 2.

Method 1200 includes an act (act 1205) of accessing the P2P mesh network. This network includes: (i) the service, (ii) a first device, and (iii) a second device. As an example, the first device may be represented by the tablet 415 of FIG. 4, and the second device may be represented by the mobile device 420.

In some embodiments, the first device is one of a mobile smart device, a laptop, a desktop, or a server. Of course, the first device can be any other type of computing device as well. In some embodiments, the second device is one of an Internet of Things (IOT) device, a mobile device, a laptop, or a desktop, though other devices can be used as well. In some embodiments, the second device is not connected, or at least not directly connected, to a WAN (e.g., the Internet).

Furthermore, the second device is not directly connected to the service; instead, the first device operates as an intermediary peer between the second device and the service.

The first device is connected to the service by way of a first P2P mesh network connection between the first device and the service. For instance, FIG. 4 shows how the tablet 415 (i.e. the first device) is connected to the service 405 via the first P2P mesh network connection 430. In some embodiments, the first P2P mesh network connection is one of an ethernet connection, a wireless fidelity (Wi-Fi) connection, a cloud web socket connection, or a wireless telecommunications broadband connection.

The second device is connected to the service by way of (i) a second P2P mesh network connection between the second device and the first device and (ii) the first P2P mesh network connection between the first device and the service. For instance, FIG. 4 shows how the mobile device 420 (i.e. the second device) is connected to the service by way of the second P2P mesh network connection 435 and the first P2P mesh network connection 430. In some embodiments, the second P2P mesh network connection is one of a universal serial bus (USB) connection, a Bluetooth connection, a Bluetooth low energy connection, a wireless fidelity (Wi-Fi) connection, or a local area network (LAN) connection.

Act 1210 includes receiving, from the first device, first data that originated at the first device. The first data is received via the first P2P mesh network connection. Optionally, the first data can include at least one of platform data for the first device, software development kit (SDK) data for the first device, or customer data for the first device. The platform data for the first and/or second device can include device log data.

Act 1215 includes receiving, from the first device, second data that originated at the second device. The second data is received by way of the first P2P mesh network connection and the second P2P mesh network connection. Optionally, the second data can include at least one of platform data for the second device, SDK data for the second device, or customer data for the second device.

Act 1220 includes providing access to a dashboard (e.g., dashboard 705 of FIG. 7). The dashboard is configured to display the first data and the second data. The dashboard can also display one or more of the following: (i) information describing each device included in the P2P mesh network, (ii) an indication as to how each device is connected to the service, (iii) a metric indicating when each device was last seen by the service, (iv) platform data for each device, (v) software development kit (SDK) data for each device, and/or (vi) a mesh identification for each device.

Example Method(s) for Controlling Peers Using a Dashboard

Figure 13:
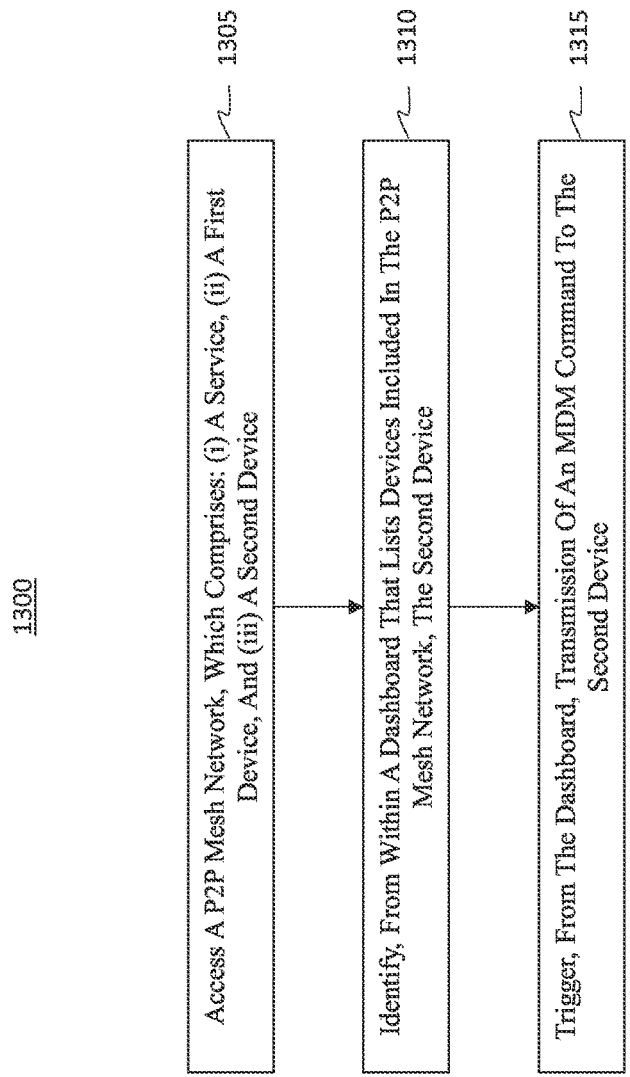
FIG. 13 illustrates a flowchart of an example method for implementing MDM in a P2P mesh network.

Attention will now be directed to FIG. 13, which illustrates a flowchart of an example method 1300 for implementing a mobile device management (MDM) platform for use in a peer-to-peer (P2P) mesh network. Method 1300 can be implemented by a service running on a computer system operating in a cloud environment, such as the service 105 of FIG. 1. In other cases, method 1300 can be implemented by a service running on an on-premise device, such as the service 205 of FIG. 2.

Method 1300 includes an act (act 1305) of accessing the P2P mesh network. This P2P mesh network includes: (i) a service, which is operating on the computer system, (ii) a first device, and (iii) a second device. As mentioned above, the computer system can be an on-premise device or, alternatively, the computer system can be operating as a server in the cloud, such that the service can be considered to be a cloud service. In the scenario where the computer system is the on-premise device, it may be the case that the computer system is not connected to a wide area network. In the scenario where the computer system is a server in the cloud, then the computer system may be a node in the cloud environment, and the service is a cloud service.

The first device is connected to the service by way of a first P2P mesh network connection between the first device and the service. The second device is connected to the service by way of (i) a second P2P mesh network connection between the second device and the first device and (ii) the first P2P mesh network connection between the first device and the service.

Act 1310 includes identifying, from within a dashboard that lists devices included in the P2P mesh network, the second device. As an example, the device labeled "Steel's IOT Washer" in FIG. 8 may be identified and may be selected, as shown by select device 800.

Act 1315 includes triggering, from the dashboard, transmission of an MDM command to the second device. The MDM command is sent to the second device over the P2P mesh network by way of the first P2P mesh network connection and by way of the second P2P mesh network connection. The MDM command can be a command to change a log level of an application that is running on the second device. The MDM command can be a command to wipe the second device. The MDM command can be a command to revoke a security certificate on the second device. The MDM command can be a command to catalog a customer application version of an application that is being developed or that is executing on the second device. In some implementations, the command can include a command for an application to update its version. In some cases, the command can cause an application to rollback to a previous application version. Notably, the device can be configured to maintain any number of previous application versions, and the dashboard can be used to not only send out version updates but also to cause a device to rollback to an earlier application version.

In some implementations, the second device may be determined to be a rogue device. The embodiments may also determine that the second device is not connected to the cloud environment. Despite the second device not being connected to the cloud environment and/or to the Internet or any type of WAN, the MDM command can still be used to wipe the rogue device. This action can beneficially occur if the rogue device is in proximity of any other peer in the P2P network. For instance, if a device has gone rogue and the location of that device is not known exactly but it is known approximately, one of the peers in the network can be brought to that general location. If the peer is within connection distance relative to the rogue device, then the peer can connect to the rogue device and cause the wipe command to be relayed to the rogue device.

Accordingly, the disclosed embodiments relate to various techniques for providing a dashboard for a P2P mesh network. The embodiments also enable users to use the dashboard to construct and transmit various MDM commands to the peers in the network. The commands can be applicable to all of the peers in the network. The commands can be tailored to individual peers in the network. In any event, the disclosed embodiments provide a dashboard for a P2P mesh network to facilitate various MDM commands.

Example Computer/Computer Systems

Figure 14:
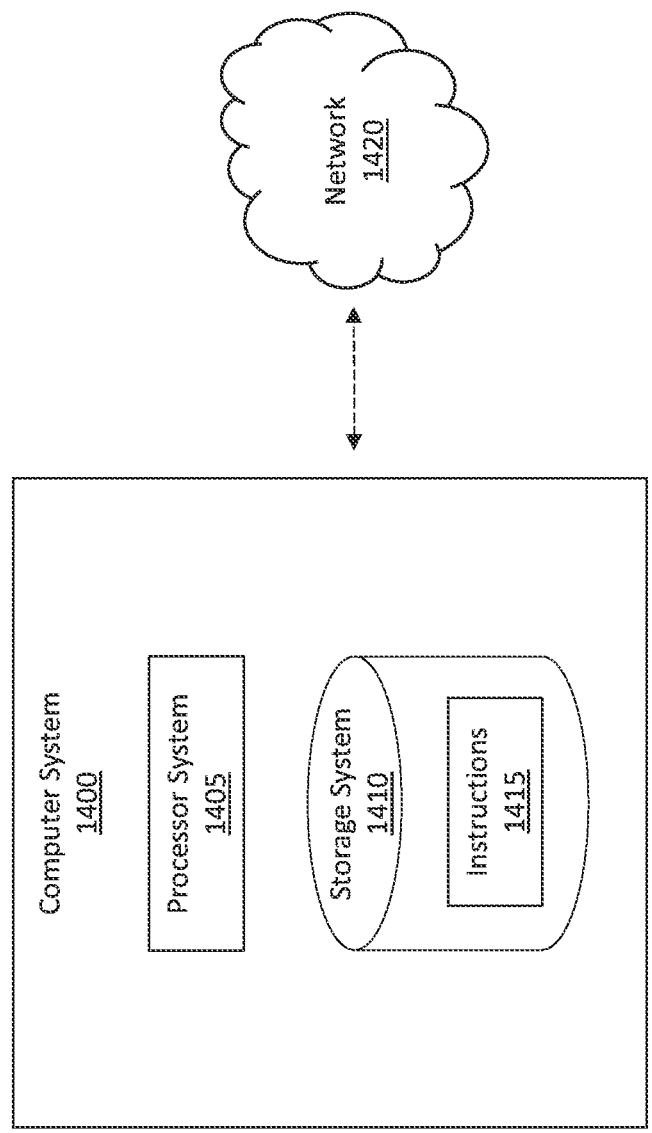
FIG. 14 illustrates an example computer system that can be configured to perform any of the disclosed operations.

Attention will now be directed to FIG. 14 which illustrates an example computer system 1400 that may include and/or be used to perform any of the operations described herein. Computer system 1400 may take various different forms. For example, computer system 1400 may be embodied as a tablet, a desktop, a laptop, a mobile device, or a standalone device, such as those described throughout this disclosure. Computer system 1400 can be a server in the cloud 110 of FIG. 1, such that the computer system hosts the service 105. Computer system 1400 can also be the on-premise device 210 shown in FIG. 2. Computer system 1400 may also be a distributed system that includes one or more connected computing components/devices that are in communication with computer system 1400.

In its most basic configuration, computer system 1400 includes various different components. FIG. 14 shows that computer system 1400 includes a processor system 1405 comprising one or more processor(s) aka a "hardware processing unit") and storage system 1410.

Regarding the processor(s) of the processor system 1405, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1400. The different components, modules, engines, and services described herein may be implemented as objects or processors that execute on computer system 1400 (e.g. as separate threads).

Storage system 1410 may include physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage system 1410 is shown as including executable instructions 1415. The executable instructions 1415 represent instructions that are executable by the processor(s) of computer system 1400 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1420. For example, computer system 1400 can communicate with any number devices or cloud services to obtain or process data. In some cases, network 1420 may itself be a cloud network. Furthermore, computer system 1400 may also be connected through one or more wired or wireless networks to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for implementing a dashboard that displays information describing devices included in a peer-to-peer (P2P) mesh network, said method being implemented by a service, the method comprising:
   accessing the P2P mesh network, which comprises: (i) the service, (ii) a first device, and (iii) a second device, wherein:
      the first device is connected to the service by way of a first P2P mesh network connection between the first device and the service, and
      the second device is connected to the service by way of (i) a second P2P mesh network connection between the second device and the first device and (ii) the first P2P mesh network connection between the first device and the service;
   receiving, from the first device, first data that originated at the first device, wherein the first data is received via the first P2P mesh network connection;
   receiving, from the first device, second data that originated at the second device, wherein the second data is received by way of the first P2P mesh network connection and the second P2P mesh network connection; and
   providing access to a dashboard, wherein:
      the dashboard is structured to display the first data and the second data,
      the dashboard is further structured to display a mapping of connections between the service, the first device, and the second device,
      the mapping of connections is structured to include user interface elements that represent transport protocols used between the service, the first device, and the second device,
      the dashboard is configured to display an environment map illustrating relative physical locations of the first device and the second device,
      the environment map is structured to display a first radius around a first location of the first device and a second radius around a second location of the second device, and
      the first radius and the second radius are calculated based on transport protocols used between the service, the first device, and the second device.

2. The method of claim 1, wherein the first P2P mesh network connection is one of an ethernet connection, a wireless fidelity (Wi-Fi) connection, a cloud web socket connection, a Bluetooth connection, or a wireless telecommunications broadband connection.

3. The method of claim 1, wherein the second P2P mesh network connection is one of a universal serial bus (USB) connection, a Bluetooth connection, a wireless fidelity (Wi-Fi) connection, or a local area network (LAN) connection.

4. The method of claim 1, wherein the first device is one of a mobile device, a laptop, a desktop, or a server.

5. The method of claim 1, wherein the second device is one of an Internet of Things (IoT) device, a mobile device, a laptop, or a desktop.

6. The method of claim 1, wherein the first data includes at least one of platform data for the first device, software development kit (SDK) data for the first device, or customer data for the first device.

7. The method of claim 6, wherein the second data includes at least one of platform data for the second device, SDK data for the second device, or customer data for the second device.

8. The method of claim 7, wherein the platform data for the second device includes device log data.

9. The method of claim 1, wherein the second device is not connected to a wide area network (WAN).

10. The method of claim 1, wherein the dashboard displays (i) information describing each device included in the P2P mesh network, (ii) an indication as to how each device is connected to the service, (iii) a metric indicating when each device was last seen by the service, (iv) platform data for each device, (v) software development kit (SDK) data for each device, and (vi) a mesh identification for each device.

11. The method of claim 1, wherein the P2P mesh network is configured to operate using a database that involves use of a conflict-free replicated data type (CRDT), wherein the CRDT is a type of data structure that enables a unit of data to be replicated across different devices in the P2P mesh network and that enables convergence between instances of the database.

12. A computer system that implements a mobile device management (MDM) platform with a peer-to-peer (P2P) mesh network, said computer system comprising:
   a processor system; and
   a storage system that stores instructions that are executable by the processor system to cause the computer system to:
      access the P2P mesh network, which comprises: (i) a service, which is operating on the computer system, (ii) a first device, and (iii) a second device, wherein:
         the first device is connected to the service by way of a first P2P mesh network connection between the first device and the service, and
         the second device is connected to the service by way of (i) a second P2P mesh network connection between the second device and the first device and (ii) the first P2P mesh network connection between the first device and the service;

identify, from within a dashboard that lists devices included in the P2P mesh network, the second device; and trigger, from the dashboard, transmission of an MDM command to the second device, wherein the MDM command is sent to the second device over the P2P mesh network by way of the first P2P mesh network connection and by way of the second P2P mesh network connection, wherein:
the dashboard is further structured to display a mapping of connections between the service, the first device, and the second device,
the mapping of connections is structured to include user interface elements that represent transport protocols used between the service, the first device, and the second device,
the dashboard is configured to display an environment map illustrating relative physical locations of the first device and the second device,
the environment map is structured to display a first radius around a first location of the first device and a second radius around a second location of the second device,
the first radius and the second radius are calculated based on transport protocols used between the service, the first device, and the second device,
the environment map is further structured to display a third radius around a third location of a third device wherein the third device was previously connected to the P2P mesh network, and
the dashboard is configured to display an estimated last known location of the third device based on a transport protocol of the third device.

13. The computer system of claim 12, wherein the computer system is a node in a cloud environment, and wherein the service is a cloud service.

14. The computer system of claim 12, wherein the MDM command is a command to change a log level of an application that is running on the second device.

15. The computer system of claim 12, wherein the MDM command is command to wipe the second device.

16. The computer system of claim 12, wherein the MDM command is a command to revoke a security certificate on the second device.

17. The computer system of claim 12, wherein the MDM command is a command to catalog a customer application version of an application that is being developed or that is executing on the second device.

18. The computer system of claim 12, wherein the computer system is not connected to a wide area network.

19. A computer system that implements a mobile device management (MDM) platform with a peer-to-peer (P2P) mesh network, said computer system operating in a cloud environment and comprising:
a processor system; and
a storage system that stores instructions that are executable by the processor system to cause the computer system to:
access the P2P mesh network, which comprises: (i) a service, which is operating on the computer system such that the service is a cloud service, (ii) a first device, and (iii) a second device, wherein:
the first device is connected to the cloud service by way of a first P2P mesh network connection between the first device and the cloud service, and
the second device is connected to the cloud service by way of (i) a second P2P mesh network connection between the second device and the first device and (ii) the first P2P mesh network connection between the first device and the cloud service;

identify, from within a dashboard that lists devices included in the P2P mesh network, the second device; and trigger, from the dashboard, transmission of an MDM command to the second device, wherein the MDM command is sent to the second device over the P2P mesh network by way of the first P2P mesh network connection and by way of the second P2P mesh network connection, wherein:
the dashboard is further structured to display a mapping of connections between the service, the first device, and the second device,
the mapping of connections is structured to include user interface elements that represent transport protocols used between the service, the first device, and the second device,
the dashboard is configured to display an environment map illustrating relative physical locations of the first device and the second device,
the environment map is structured to display a first radius around a first location of the first device and a second radius around a second location of the second device,
the first radius and the second radius are calculated based on transport protocols used between the service, the first device, and the second device,
the environment map is further structured to display a third radius around a third location of a third device wherein the third device was previously connected to the P2P mesh network, and
the dashboard is configured to display an estimated last known location of the third device based on a transport protocol of the third device.

20. The computer system of claim 19, wherein the dashboard displays (i) information describing each device included in the P2P mesh network, (ii) an indication as to how each device is connected to the service, (iii) a metric indicating when each device was last seen by the service, (iv) platform data for each device, (v) software development kit (SDK) data for each device, and (vi) a mesh identification for each device.

21. The computer system of claim 19, wherein the second device is determined to be a rogue device, wherein the second device is not connected to the cloud environment, and wherein the MDM command wipes the rogue device despite the rogue device not being connected to the cloud environment.

* * * * *